United States Patent Office 3,289,444
Patented Dec. 6, 1966

3,289,444
PROGRAM CONTROL DEVICE
FOR ROLLING MILLS
Yutaka Takuma, Hitachi-shi, Japan, assignor to Hitachi,
Ltd., Tokyo, Japan, a corporation of Japan
Filed Sept. 26, 1963, Ser. No. 311,770
Claims priority, application Japan, Sept. 28, 1962,
37/41,906
1 Claim. (Cl. 72—7)

This invention is concerned with the program control of rolling mills particularly of the reversible type.

According to the present invention, a program control device for a rolling mill comprises automatic means for effecting a predetermined program automatically in response to successive rolling passes, and take over control means for effecting a different predetermined program independently of the number of rolling passes, whereby a particular program can be performed as required under human control.

In the automatic operation of a rolling mill employing a predetermined program in the form of program signals stored in a punched card, a magnetic or perforated tape or the like, the stored program must be read out and converted into electrical signals. With rolling mills of the reversible type, however, it is necessary to vary the reduction, roll velocity, etc. between rolling passes and the program reading operation is generally performed keeping step with the advance of the rolling passes. In some instances, however, it is desirable to start the rolling operation after the rolling mill is set midway of the program, for example, for the fifth pass. The present invention is intended to meet such demand and has for its object to provide a semi-automatic program control device including means for effecting the program reading independently of the advance of the number of rolling passes.

The present invention will now be described with reference to the accompanying drawings, which diagrammatically illustrate one embodiment of the invention and in which.

Figure 1:
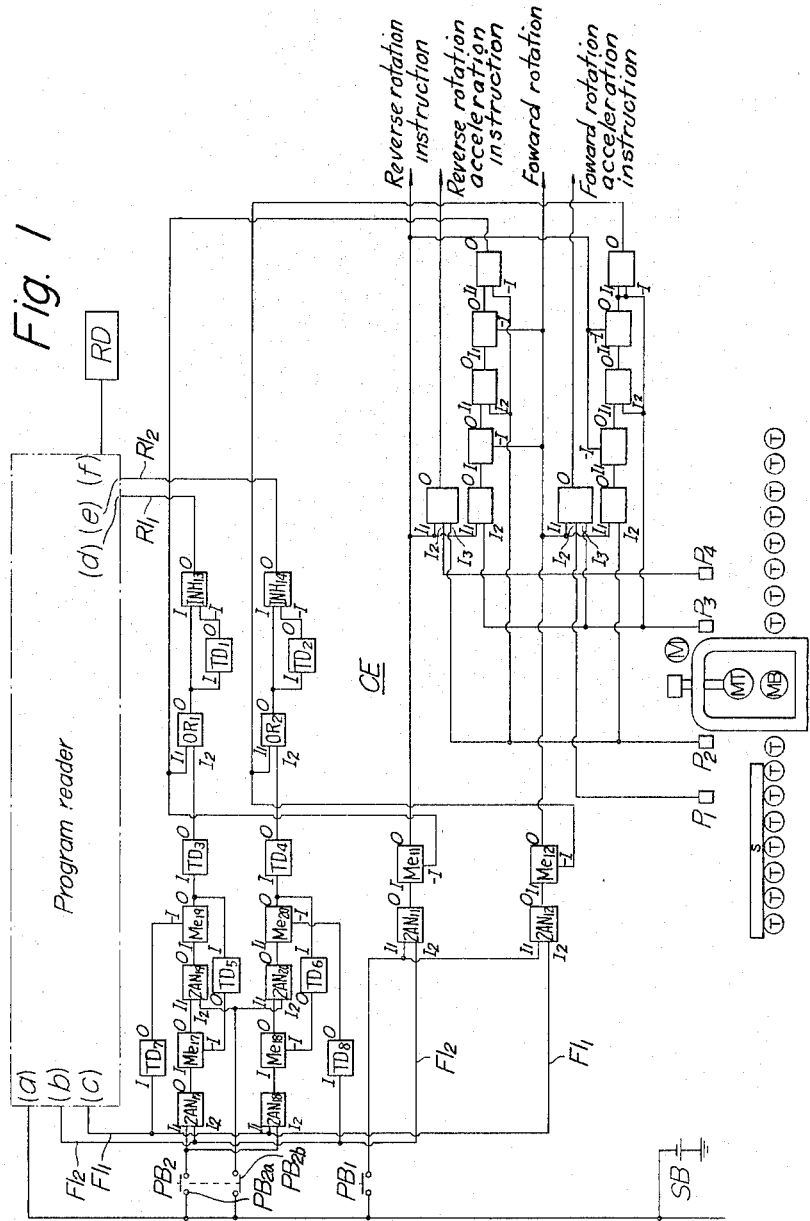
FIG. 1 is a circuit diagram of the embodiment of the invention.

Reference characters $(a)$, $(b)$, $(c)$, ... $(f)$ indicate the same lines leading from and to the program reading unit in the two figures.

Figure 2:
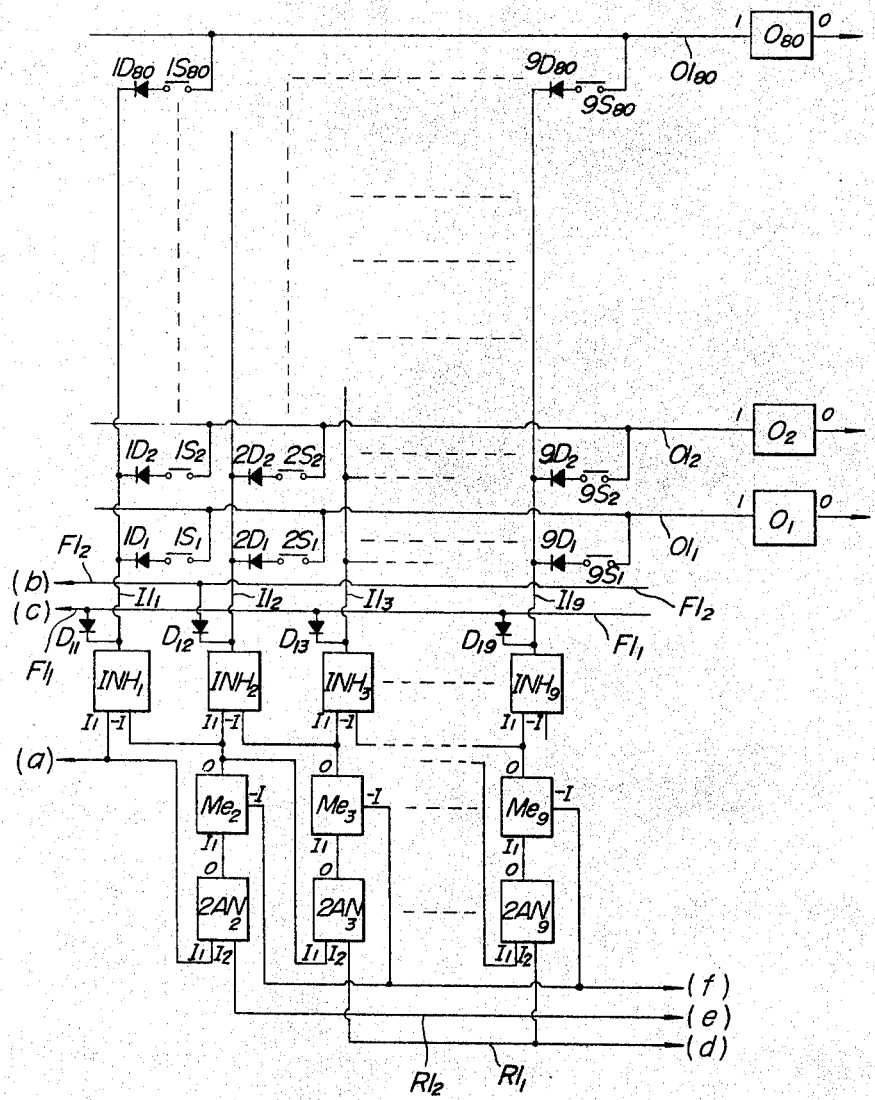
FIG. 2 is a circuit diagram illustrating in detail the program reading unit indicated by the dash-dot block diagram in FIG. 1.

Referring first to FIG. 2, input lines $Il_1-Il_9$, are normally fed with an input voltage in regular sequence as the rolling passes advance. Output lines $Ol_1-Ol_{80}$ include respective output elements $O_1-O_{80}$, which are each operated on or off in response to the presence or absence of the output signal in the output line.

Diodes $1D_1-1D_{80}$ are arranged between the first input line $Il_1$ and respective output lines $Ol_1-Ol_{80}$, diodes $2D_1-2D_{80}$ between the second input line $Il_2$ and respective output lines $Ol_1-Ol_{80}$, and so forth including diodes $9D_1-9D_{80}$ connected between the ninth input line $Il_9$ and respective output lines $Ol_1-Ol_{80}$. Make-break elements $1S_1-1S_{80}, 2S_1-2S_{80}, \ldots 9S_1-9S_{80}$ are connected in series with the above groups of diodes and are controlled by a memory relay or other suitable means for example to close during perforations in the program and to open during nonperforations therein. Thus, these make-break elements S serve to reproduce in electrical form the program stored in the program card.

Inhibit elements $INH_1-INH_9$ have each two input terminals $I_1$ and $-I$ and their outputs are supplied to input lines $Il_1-Il_9$ only when the input terminal $I_1$ has an input but inhibit terminal $-I$ has no input. Memory elements $Me_2-Me_9$ have each set and reset input terminals $I_1$ and $-I$. AND elements $2AN_2-2AN_9$ have each two input terminals $I_1$ and $I_2$ and provide output signals, only when input signals $I_1$ and $I_2$ are supplied to both the two input terminals. The output signals from the AND elements then provide the set input $I_1$ to respective memory elements $Me_2-Me_9$. With this reading unit, the memory elements are reset by a reset device RD (FIG. 1) at the start of a rolling operation. As the rolling operation proceeds, sequence control CE (FIG. 1) operates to energize read-out shift lines $Rl_1$ and $Rl_2$ so as to successive shift the voltage of the input lines $Il_1-Il_9$:

A feedback line $Fl_1$ is connected with odd-numbered input lines $Il_1, Il_3, \ldots Il_9$ by way of diodes $D_{11}, D_{13}, \ldots D_{19}$ and another feedback line $F_2$ with even-numbered input lines $Il_2, Il_4, \ldots Il_8$ by way of diodes $D_{22}, D_{24}, \ldots D_{28}$.

Being constructed and arranged in this manner, the program reading unit is controlled by the sequence control unit CE through the intermediary of line $a$ from power source SB, shift lines $Rl_1$, $Rl_2$ and line $f$ from reset device RD while returning the output signal to the sequence control CE by way of feedback lines $Fl_1$, $Fl_2$.

For starting operation, a pushbutton switch $PB_1$ is provided to give input $I_1$ to AND elements $2AN_{11}$ and $2AN_{12}$. When the AND elements are fed with the input $I_1$ and simultaneously with the input $I_2$, which comes through feedback lines $Fl_1$ and $Fl_2$, they give set input $I_1$ to respective memory elements $Me_{11}$ and $Me_{12}$, provided for forward and reverse rotation instructions. These memory elements $Me_{11}$ and $Me_{12}$, when instructions for forward or reverse rotation are given, supply input $I_1$ to AND elements $2AN_{13}-2AN_{14}$ and $3AN_1-3AN_2$, respectively. AND element $3AN_1$ is turned on to give an order for reverse acceleration when fed simultaneously with input signals $I_1$, $I_2$ and $I_3$ from memory element $Me_{11}$ and photoelectric devices $P_2$, $P_4$ while AND element $3AN_2$ is turned on to give an order for forward acceleration when fed simultaneously with input signals $I_1$, $I_2$ and $I_3$ from memory element $Me_{12}$ and photoelectric devices $P_1$, $P_3$. Memory elements $Me_{13}$ and $Me_{14}$ are given a set input $I_1$ which is the output of AND elements $2AN_{13}$, $2AN_{14}$, and a reset input $-I$ as the output of memory elements $Me_{11}$, $Me_{12}$. AND elements $2AN_{15}$ and $2AN_{16}$ turn on to impart input $I_1$ to respective memory elements $Me_{15}$ and $Me_{16}$ when input $I_1$ from memory element $Me_{13}$ and $Me_{14}$ as well as input $I_2$ from photo-electric devices $P_2$ and $P_3$ are given at the same time.

These memory elements $Me_{15}$ and $Me_{16}$ are reset when an order for forward or reverse rotation is issued. Inhibit elements $INH_{11}$ and $INH_{12}$ turn on when input $I_1$ from respective memory elements $Me_{15}$ and $Me_{16}$ is given but no inhibit input $-I$ is given from photoelectric devices $P_2$, $P_3$. The output of inhibit elements $INH_{11}$, $INH_{12}$ is impressed upon the input $I_1$ of respective OR elements $OR_1$, $OR_2$. The OR elements are each turned on when either of its input terminals $I_1$ and $I_2$ is given a signal to give input $I_1$ to inhibit element $INH_{13}$ or $INH_{14}$ while energizing time delay element $TD_1$ or $TD_2$. Inhibit terminals $-I$ of the inhibit elements $INH_{13}$ and $INH_{14}$ receive signals from the respective delay elements $TD_1$, $TD_2$. The output terminals O of inhibit elements $INH_{13}$, $INH_{14}$ are connected to shift lines $Rl_1$ and $Rl_2$, respectively.

A pushbutton switch $PB_2$ is provided to send signals to said OR elements $OR_1$ and $OR_2$ to permit the program reading to proceed under human control and has contacts $PB_{2a}$ and $PB_{2b}$. AND elements $2AN_{17}$ and $2AN_{18}$ turn on when they receive input $I_1$ or $I_2$ through contact $PB_{2a}$ and at the same time through feedback line $Fl_1$ or $Fl_2$. Memory elements $Me_{17}$ and $Me_{18}$ are arranged to be set by these AND elements. Another pair of AND elements $2AN_{19}$ and $2AN_{20}$ act to set memory element $Me_{19}$, $Me_{20}$ when turned on by coexistence of the input $I_1$ from memory element $Me_{17}$ or $Me_{18}$ and input $I_2$ from contact $PB_{2b}$.

The memory elements $Me_{19}$ and $Me_{20}$ impart input I to delay elements $TD_3$, $TD_4$ while imparting reset input to memory elements $Me_{17}$ and $Me_{18}$ through respective delay elements $TD_5$ and $TD_6$. Contrariwise, memory elements $Me_{19}$, $Me_{20}$ are reset by reset input $-I$ given from feedback lines $Rl_1$, $Rl_2$ through delay elements $TD_7$ and $TD_8$, respectively.

With this arrangement, at the start of the rolling operation, all of the memory elements $Me_2$–$Me_9$ are reset by reset device RD so that the voltage of power source SB appears on feedback line $Fl_1$ through the intermediary of inhibit element $INH_1$ and diode $D_{11}$. Then, upon depression of the pushbutton switch $PB_1$, AND element $2AN_{12}$ turns on with its two input terminals $I_1$ and $I_2$ energized to set memory element $Me_{12}$. Upon the setting of memory element $Me_{12}$, the order for forward rotation is issued to the main roll of the rolling mill and to the table drive motor. Meanwhile, the amount of reduction, main roll velocity, etc. are ordered through output lines $Ol_1$–$Ol_{30}$ according to the first reading from the program by the program reader so that the rolling mill is adjusted to the values ordered. Thereafter, as the rolling stock S is rolled proceeding from left to right, photoelectric devices $P_1$, $P_2$, $P_3$ are operated to set memory element $Me_{14}$ by way of AND element $2AN_{14}$. As memory element $Me_{14}$ is turned on, AND element $2AN_{16}$ is also turned on with both input terminals $I_1$ and $I_2$ energized and memory element $Me_{16}$ is set. The photoelectric devices $P_1$ and $P_3$ are operable to turn on AND element $3AN_2$ for issuance of the order for forward acceleration.

When the memory element $Me_{16}$ is set to send input signal $I_1$ to the inhibit element $INH_{12}$, the rolling material S still underlying the photoelectric device $P_3$, the inhibit input terminal $-I$ remains energized so that the inhibit element $INH_{12}$ has no output.

Upon completion of the first rolling pass, the trailing end of the stock S is moved past the photoelectric device $P_3$ to allow the inhibit element $INH_{12}$ to produce an output, which enters OR element $OR_2$ as input $I_1$ to turn on inhibit element $INH_{14}$, giving a signal voltage to shift line $Rl_2$. After a predetermined time period, the inhibit element $INH_{14}$ receives the output of delay element $TD_2$ to restore its off state so that a pulse voltage is given to line $Rl_2$. On the other hand, AND element $2AN_2$ normally receiving input $I_1$ is turned on with the arrival of the pulse to set memory element $Me_2$. In this manner, inhibit element $INH_1$ is given an inhibit input $-I$ to turn off while inhibit element $INH_2$ is given an inlet I to turn on. Therefore, the voltage previously being applied to the first input line $Il_1$ is shifted to the second line $Il_2$ so that the rolling mill is set to values for the second pass. When the second line $Il_2$ is activated to energize feedback line $Fl_2$, the AND element $2AN_{11}$ is given input $I_2$ and turns on simultaneously with the depression of pushbutton switch $PB_1$ to set memory element $Me_{11}$ and the order for reverse rotation is issued. (Incidentally, the memory element $Me_{12}$ for ordering forward rotation has already been reset by the output of inhibit element $INH_{12}$.) Accordingly, the mill reverses its rotation and the stock S thereon is started to travel from right to left for the second pass.

Upon completion of the second pass, photoelectric devices $P_2$, $P_3$, $P_4$ operate in a manner similar to that during forward rotation to turn on inhibit element $INH_{11}$ to reset the reverse rotation memory element $Me_{11}$ while giving input $I_1$ to OR element $OR_1$. Therefore, pulses are sent for a definite time period from inhibit element $INH_{13}$ to the shift line $Rl_1$ to set memory element $Me_3$ through the intermediary of AND element $2AN_3$. At the same time, inhibit input $-I$ is allowed to enter and turn off inhibit element $INH_2$ while input I is given to inhibit element $INH_3$ to switch the voltage impression from input line $Il_2$ to $Il_3$. Thus, the amount of reduction, velocity of the main roll, etc. are set afresh according to the program for the third pass and upon operation of pushbutton switch $PB_1$ the third rolling pass is started. In this illustration, up to nine passes can be effected by repeating the procedure described above.

With the above described apparatus, the reading unit does not operate in any effective manner unless the rolling passes advance, as will readily be noted. This involves inconveniences in performance tests and when the rolling program is desired to start from any intermediate rolling pass. The drawbacks of conventional program control devices for rolling mills can be overcome by the present invention as will be apparent from the following description.

Assume that a rolling operation is desired only to follow the latter part of the program, for example, from the fifth to the last pass. At first, pushbutton $PB_2$ is pressed with the entire control system being conditioned for initiation of the first pass. On this occasion, inhibit element $INH_1$ has turned on to feed a voltage to the feedback line $Fl_1$. Therefore, depression of pushbutton $PB_2$ sends inputs $I_1$ and $I_2$ to AND element $2AN_{18}$ to turn on the latter thereby to set memory element $Me_{18}$. Subsequently when pushbutton $PB_2$ is restored (into the illustrated state), AND element $2AN_{20}$ receives two inputs $I_1$ and $I_2$ to set memory element $Me_{20}$. This memory element $Me_{20}$ imparts input signals to the reset input terminal $-I$ of memory element $Me_{18}$ by way of delay element $TD_6$ and to the input terminal $I_1$ of OR element $OR_2$ by way of delay element $TD_4$. Therefore, after the lapse of the preset time, OR element $OR_2$ acts to turn on the inhibit element $INH_{14}$ to impress a voltage upon shift line $Rl_2$. (The voltage given to the shift lines has a pulse shape similar to that of rolling passes.) As the result, AND element $2AN_2$ is turned on and the input voltage is switched from first input line $Il_1$ to second input line $Il_2$. Similarly, each time when pushbutton $PB_2$ is pressed and released, an input voltage is given alternately to shift lines $Rl_1$ and $Rl_2$, causing the program reading to proceed successively just in the same manner as when sequence control device CE operates at each rolling pass. Accordingly, the operator can start the rolling mill when inhibit element $INH_5$ has been turned on to effect the fifth and succeeding passes.

As apparent from the foregoing, the program control device of the present invention can effect the program reading independently of the actual rolling operation, and is highly advantageous in that it facilitates performance tests of rolling mills of the type and also enabling the operator to start the rolling operation with any intermediate pass, say, with fifth pass thereof.

What is claimed is:

A program control device for rolling mills including in combination program reading means for providing automatic programmed control over the operation of a rolling mill, logic-circuit means including sensors for observing operation of the rolling mill, said logic-circuit means being coupled to and controlled by said program reading means and being coupled to control automatically the cyclical operation of the rolling mill, and manually operable take-over control means coupled to said program reading means in parallel with said logic circuit means for stepping the program reading means through any desired number of pre-programmed operational passes independently of the operation of the rolling mill.

References Cited by the Examiner

UNITED STATES PATENTS

| 1,049,377 | 1/1913 | Lewis | 72—7 |
| 2,006,765 | 7/1935 | Hudson | 72—7 |
| 2,264,096 | 11/1941 | Mohler | 72—16 |
| 2,894,422 | 7/1959 | Hautau | 72—7 |
| 3,081,653 | 3/1963 | Kincaid | 72—240 |

FOREIGN PATENTS 129,933  7/1959  Russia.

CHARLES W. LANHAM, *Primary Examiner.*

W. H. JUST, *Assistant Examiner.*